United States Patent [19]

Clements

[11] Patent Number: 4,938,068

[45] Date of Patent: Jul. 3, 1990

[54] PRESSURE TRANSDUCER

[75] Inventor: David J. Clements, Bexhill, England

[73] Assignee: The Slope Indicator Co., Seattle, Wash.

[21] Appl. No.: 250,179

[22] Filed: Sep. 28, 1988

[51] Int. Cl.5 ............................................. G01L 9/00
[52] U.S. Cl. ..................................... 73/704; 73/729; 73/DIG. 1
[58] Field of Search ................ 73/702, 703, 704, 728, 73/729, DIG. 1

[56] References Cited

U.S. PATENT DOCUMENTS

| | | | |
|---|---|---|---|
| 2,447,817 | 8/1948 | Rieber | 73/704 |
| 3,062,052 | 11/1962 | Kolb | 73/704 |
| 3,216,260 | 10/1961 | Erdely | |
| 3,543,585 | 12/1970 | Brown | 73/704 |
| 3,618,360 | 8/1969 | Curtis | |
| 3,638,496 | 2/1972 | King | 73/728 |
| 3,935,745 | 2/1976 | Jonell et al. | 73/704 |
| 4,149,422 | 4/1949 | Olsen et al. | 73/704 |
| 4,255,973 | 3/1981 | Karplus | 73/704 |
| 4,471,660 | 9/1984 | Bodge | 73/704 |
| 4,476,725 | 10/1984 | Chorel et al. | |
| 4,498,344 | 2/1985 | Dinger | |
| 4,644,796 | 2/1987 | Ward | |
| 4,703,216 | 10/1987 | Corbett | |
| 4,739,664 | 4/1988 | Hetrick | |

OTHER PUBLICATIONS

"Norwegian Practice in Instrumenting Dams", by K. Y. Nilsen, E. DiBiagio and A. Andresen, 11-25-88.

Primary Examiner—Joseph A. Orsino
Assistant Examiner—Brent A. Swarthout
Attorney, Agent, or Firm—Patrick M. Dwyer; David L. Garrison

[57] ABSTRACT

A pressure transducer 10 is disclosed wherein a bellows 11 is expanded by an external pressure applied at pressure port 16. The force created by external pressure applied to bellows 11 is mechanically transferred to one end of a vibrating elastic member 14 by axial displacement of saddle 13. A change in external pressure is thereby read as a change in resonant frequency of elastic member 14.

13 Claims, 2 Drawing Sheets

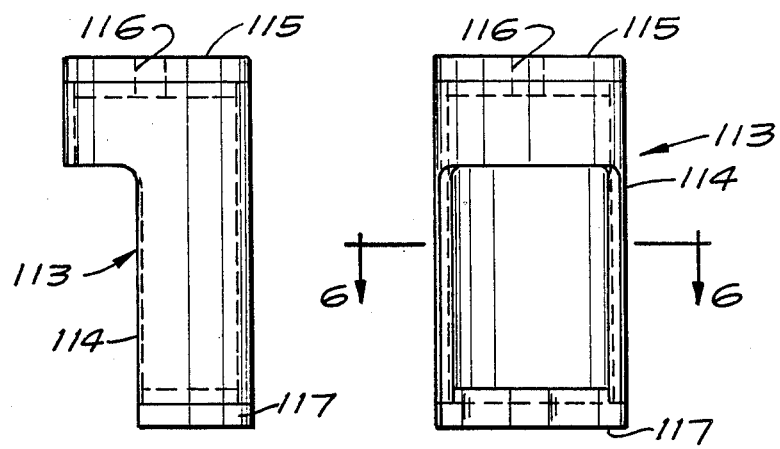
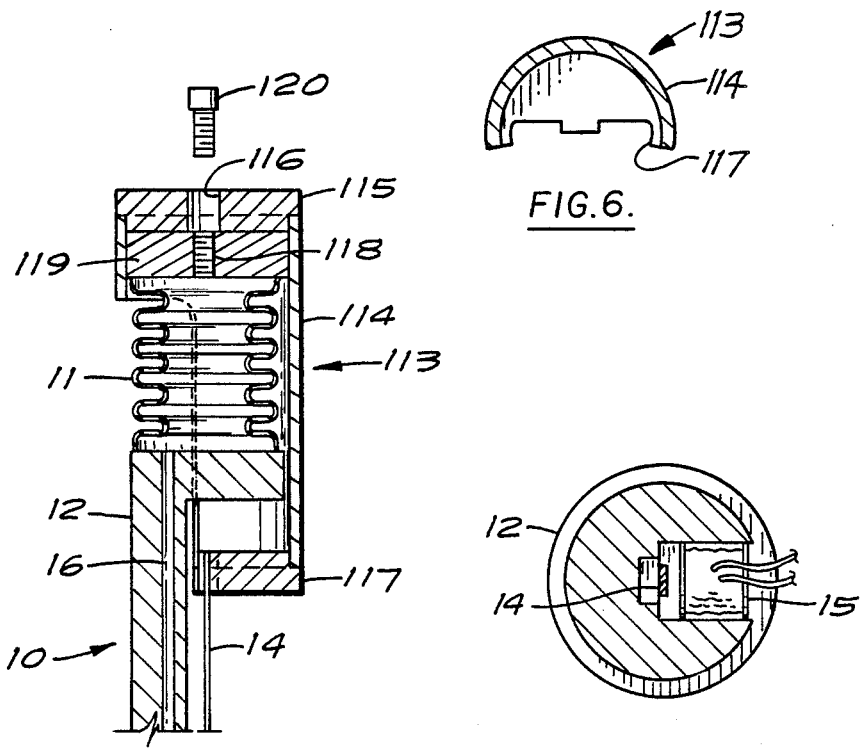

PRESSURE TRANSDUCER

TECHNICAL FIELD

This invention relates to the field of pressure sensing and measuring devices. More particularly the invention relates to transducers employed to directly measure the magnitude of a pressure external to the transducer by means of changes in stress in a vibrating elastic member.

BACKGROUND OF THE INVENTION

Conventional pressure transducers accommodate the applied force by means separate from those associated with the generation of the related electrical signal output. For example, a known electrically operated pressure transducer relies on the deflection of a precisely machined diaphragm to provide the mechanical strain to activate corresponding changes in strain in a vibrating wire attached or coupled to the diaphragm. The applied force is thus dissipated on the diaphragm and the electrically excited vibrating wire only measures the diaphragm's response to that force. Because what is initially produced is the strain or deformation in the diaphragm, which in turn is translated to strain or deformation in the wire, such transducers commonly encounter problems of nonlinearity over the range of expected measurement values, in addition to other problems in the wire such as long-term wire creep or tension loss, crimp slippage or deformation, and difficult thermal expansion compensation. Moreover, the typical reverse direction in which strain in the vibrating wire is relieved compounds all of the above problems.

FIG. 3 is typical of a well established vibrating wire pressure transducer which consists of four parts. Sensing diaphragm 1 is a thin, precisely machined pressure sensing diaphragm, sealed and rigidly mounted to body 2. The diaphragm has a controlled axial mechanical strain response when subjected to an external pressure different from the internal reference pressure. Ranges may be changed only by changing its geometry, or by changing the flat surface thickness of the diaphragm. Body 2 forms the reference or datum bed across which a musical quality wire 3 is stretched and retained between itself and the center point of the diaphragm 1. Prestressed musical wire 3 is prestressed during assembly to approximately 25% of yield strength and retained between body 2 and diaphragm 1. This prestressed musical wire forms an element of the transducing mechanism in well known fashion by responding to the diaphragm axial strain caused by external pressure application to the diaphragm. Wire tension thereby decreases as the diaphragm is strained inward by increased external pressure. Thus the frequency at which it will mechanically vibrate is a function of diaphragm deflection and, hence applied pressure. Permanent magnet and coil assembly 4 provides a means in a well known manner of both electromagnetically exciting the wire into oscillation and subsequently facilitating the generation of an output electrical signal at the wire's resonant frequency to a remote measuring point via a suitable cable.

This conventional prestressed wire type pressure transducer exhibits one significant advantage over other types of established pressure sensors in that its electrical output signal format is frequency rather than analog magnitude related, and as such is largely insensitive to cable leakage, resistivity changes, etc. As a result of this attribute, the reading of such instruments over several kilometers of cable is possible without downgrading of accuracy. For this reason the vibrating wire type of device is favored in the hostile environment of civil engineering applications, particularly with regard to foundations and earthworks. However, the prestressed vibrating wire device discussed above inherently suffers certain limitations which over the life of the installed, and often irrecoverable transducer can and has raised doubts in users regarding the long-term stability of such units. One of the potential problems relates to long-term creep or loss of tension in the wire, whereby with time the stress level in this prestressed component decreases independent of applied pressure, and thus lowers the wire's resonant frequency.

A prestressed vibrating wire type pressure transducer is also known which employs a bellows with a very high spring rate in series with the prestressed vibrating wire. As with other conventional transducers of this type an increase in pressure applied to the interior of the bellows results in a decrease in tension in the vibrating wire. The spring rate of the bellows is necessarily high in order to maintain the high stress levels in the wire which are required in this type transducer.

Since this type of transducer, as discussed above, senses applied pressure as a relief of tension in the prestressed wire which reduces the resonant vibrating frequency of the wire, and since reduced frequency is usually indicative of increased applied pressure, such a long-term decrease in wire stress, and hence resonant frequency is taken by the user to be an increase in applied pressure, whereas in reality all pressure readings subsequent to tension loss are in error by the unknown extent of this tension loss.

The dimensions of this potential limitation can be illustrated by considering a typical vibrating wire pressure transducer with the following characteristics:

Range +0-100 psi

Diameter of wire +0.009 inch

Length of wire +1.5 inch

*Frequency output range* $+4000 \times f^2/1000$ *digits* where $f^2/1000$ refers to a preferred readout mode wherein $f^2$ is the square of the vibrational frequency, and $f^2/1000$ is a single unit for readout purposes. In such a case, wire prestressing during assembly will stretch it by about 3 thousandths of an inch to achieve the zero applied pressure frequency of about 3000 Hz (9000 $f^2/1000$ indicated reading).

As the unit is externally loaded to full range pressure (100 psi) the pretensioned wire stress will reduce as the diaphragm strains to the applied pressure. This equates to approximately 1.2 thousandths of an inch strain over the free wire length, and as such represents the response over the full operating range of the instrument.

In terms of strain therefore, only one hundredth part of 0.0012 inch, or 0.000012 inch component creep, in the diaphragm, body, wire or wire gripping points is necessary to produce an offset in frequency equivalent to 1% of instrument range. In terms of wire stress, only 0.4% of loss in wire prestress is necessary to cause a 1% instrument zero drift. In most civil engineering applications this cannot be detected or quantified after the unit is irretrievably installed for use.

In common with most established types of pressure transducers employing a diaphragm and separate strain measuring elements, the prestressed vibrating wire device design discussed above requires special attention to be paid to the relatively different temperature coefficient factors of the various components, in order to minimize performance changes which occur where the temperature effects on the body 2 and diaphragm 1 do not match the effects on the prestressed wire 3.

Where temperature effects on the body and diaphragm do not match temperature effects on the wire, differential expansion or contraction occurs and causes output frequency changes to occur which cannot be differentiated from real applied pressure variations. This is so even in cases where there are careful design efforts to select the correct proportion of different materials in diaphragm and body parts to match the temperature response over a certain range of temperatures because all components are not necessarily at the same temperature at any given time.

Temperature gradients across the various components, as the influencing temperature changes, will cause significant though transient errors in the magnitude of applied pressure as read. This factor is usually of greatest significance at the time of installation where the instrument is often subjected to changes of temperature environment as placement occurs, and on such occasions the registering of erroneous datum readings before temperature stabilization occurs is not uncommon.

Accordingly it is an object of the invention to measure the magnitude of a pressure by applying it directly, without the intervening modality of diaphragm strain, as completely as practically possible to a vibrating elastic member which is substantially not prestressed and which bears virtually all of the force of such pressure, and in so doing, mechanically provides by its nature, means by which a frequency related, rather than analogue based, electrical output signal is derived directly from the stress in the elastic member.

It is another object of the invention to substantially reduce the prestress by reversing the applied pressure's effect on vibrating elastic member so that stress increases with increasing applied pressure.

It is another object of the invention to accommodate an applied pressure force and generation of a related electrical signal output by one in the same means.

It is a further object of the invention to significantly minimize the effect of long-term creep or tension loss discussed above by employing material in the vibrating elastic member other than hard musical grade wire and by not prestressing the vibrating elastic element or doing so at levels considerably below the 25% of yield figure referred to above.

It is a still further object of the invention to provide a vibrating elastic member configuration which is inherently less sensitive to thermal expansion and to temperature gradient effects than the transducers discussed above.

It is another object of the invention to provide increased reading resolution for full rated pressure range.

It is a further object of the invention to provide an invention with a design which results in uniformity of design for a variety of pressure ranges and in low completed item wastage rates.

These and other objects of the invention are accomplished according to the disclosure of the invention herein described as more fully set forth below.

DISCLOSURE OF INVENTION

The invention is comprised of apparatus and method of measuring the magnitude of an external pressure against a reference pressure by applying it as directly and as completely as practically possible through a formed metal bellows to a vibrating elastic member which bears virtually all of the force of such pressure. In the apparatus and method of the invention, the magnitude of the difference between the external pressure and the reference pressure causes a change, in a well known manner, in the resonant frequency at which the vibrating elastic member vibrates. Thus the frequency based electrical output signal is derived directly from the change in stress in the elastic member.

A method of the invention comprises the steps of (1) employing a formed metal bellows which is responsive to the positive difference between an external pressure and a reference pressure by expanding along a single axis in a single direction, one end of the bellows being fixed to a base; (2) translating the mechanical motion of the expansion of said bellows, by means of a saddle, to a vibrating elastic member in such a way that the direction of increase in tension in said vibrating elastic member is the same as the direction of the mechanical motion of said bellows; (3) sensing and transmitting, by well known means, the stress related increase in resonant vibrating frequency of said vibrating elastic member which is produced by the increase in stress in the member introduced by said saddle. In a preferred embodiment, a reference pressure will typically be chosen such that all pressure to be read within a designed operating range will be greater than the reference pressure, although changes in pressure will obviously be both positive and negative and the bellows will expand as well as contract. In this preferred embodiment, it is not necessary to have a positive stress of tension in the vibrating elastic element. There need only be sufficient tension in the elastic member to obtain a resonant frequency in the member, and this is accomplished in a preferred embodiment by evacuating the reference chamber after the elastic member is installed. Depending upon the application, the reference chamber may also be ported to atmosphere or to a second pressure, so long as sufficient tension is applied to the elastic member by other means. Obviously there should be no negative or compressive preloading such as to bend the elastic member. The apparatus of the invention comprises a body upon which is mounted a formed metal bellows. The body contains a pressure port communicating from the interior of said bellows to the exterior of the apparatus; a saddle which is secured to the free end of the bellows and partially encloses it to provide, at the end of said saddle opposite to the end attached to the bellows, a centralized mounting point for one end of a vibrating elastic element, which mounting point lies on the axial center line of the bellows, so that the mechanical force generated within the bellows is applied via the bellows saddle to one end of the vibrating elastic member which is retained at its other extremity by attachment to a point on the body also on the center line of said bellows and is thereby subjected to the full loading produced through the expansion of the bellows under the influence of an external pressure applied through the pressure port in the body; a vibrating elastic member so proportioned that its cross-sectional area and material strength are adequate to withstand tensile forces greater than those resulting in the application of the maximum rated pressure of the transducer; a coil assembly to provide means for electrically exciting and for obtaining a frequency output corresponding to the resonant frequency of the vibrating elastic member; and a housing enclosing the above component and attached to the body in such a way as to create a chamber within which a reference pressure is maintained.

The formed metal bellows is normally constructed of stainless steel and is selected to have as small a spring rate as possible which is nonetheless consistent with a burst pressure rating well in excess of the designed transducer pressure range. It will be appreciated that transducers according to the invention may be designed with any desired pressure range depending upon the engineering application as long as appropriate burst pressure ratings are employed with a selected bellows. Spring rates between 40 and 200 pounds per inch of axial deflection have been tested in bellows having operating pressure burst ratings between 200 and 600 psi. The criteria for selecting spring rate and burst pressure rating in a preferred embodiment are as disclosed herein. As the bellows expands axially under the influence of an external pressure which is greater than the internal reference pressure, the bellows serves as a force converter whereby virtually the entire pressure difference between the external pressure and the internal pressure is converted into a mechanical force with the only losses being associated with the relatively low spring rate. Formed metal bellows with effective cross-sectional areas or piston areas between 0.050 and 0.16 square inches have been found effective in preferred embodiments to enable the use of thin steel strips as vibrating elastic members where said strips may be taken from stock materials at standard thicknesses. However any effective cross-sectional area consistent with the above requirements may be employed where it is thought appropriate or desirable by persons having ordinary skill in the art to employ different cross-sectional shapes in the vibrating elastic members or to use different members with perhaps custom made thickness.

The body is designed to be somewhat dimensionally stable and is as insensitive to external influences and stresses as is practically possible. In a preferred embodiment the body is made from stainless steel, and machined by conventional techniques to have an upper surface to which the bellows may be attached, a sealing surface against which the housing may be attached and sealed, surfaces to which the coil assembly may be attached and a planar surface perpendicular to said upper surface to which one extremity of the vibrating elastic member may be attached. In a preferred embodiment the vibrating elastic member is attached to the body by spot welding and attachment of the bellows to the body and the housing to the body are conventional seam welding so that the joined assembly is hermetically sealed. However other methods of attachment will occur to persons having ordinary skill in the art without departing from the spirit and scope of this invention.

In a preferred embodiment the top of the bellows selected will be sealed by welding to it a cap having in its center a threaded hole for use in alignment as described further below. The bellows saddle may be any shape adapted to transmit mechanical motion at one extremity of the bellows in the same direction as, and along the center line of, the axial displacement of said bellows. In a preferred embodiment the bellows saddle is comprised of a circular disk, a section of cylindrical tubing and a roughly semicircular mount which are jig welded using a spot welder after an appropriately shaped slot has been removed from said tubing so that a saddle of shape designed to slip over the completed welded bellows/body assembly is achieved. The portion of the tube which is cut away need only be sufficient to permit installation of the saddle over the attached bellows/body assembly. The three elements of the bellows/saddle assembly in a preferred embodiment are jig welded using a spot welder to align the center line of an alignment hole in the center of said disk with the center line of a mounting surface on said semicircular mount in such a way that the center line of said bellows, when said saddle is attached by pressure sealed screw through said alignment hole, runs through the center line of said screw, and said mounting plane of said semicircular mount, which is then coplanar with the mounting surface on the body for the other extremity of said vibrating elastic element. In a preferred embodiment materials selected from which to make the saddle assembly are stainless steel.

In a preferred embodiment as stated above, the vibrating elastic member takes the form of a single thin steel strip However other materials and other cross-sectional shapes, as well as multiple or levered elastic members, can be employed without departing from the scope of the invention, provided the cross-sectional areas and material strengths chosen are adequate to withstand tensile forces greater than those resulting from the application of the maximum rated pressure to the transducer. Overall transducer sensitivity or range may be selected or changed at will by choice of appropriate thickness and widths and by choice of material in the vibrating elastic member.

The apparatus according to the invention has reduced sensitivity to the detrimental effects of long-term creep in its components. In the apparatus as described, external pressure is applied internally to the bellows, while the outside of the bellows is exposed to a reference pressure, which in a preferred embodiment approaches a vacuum, to produce a linear or piston-type force. This force is in turn applied to a vibrating elastic member such as the thin steel strip discussed above. The effect of long-term creep is moderated by the relatively low spring rate of the bellows which absorbs only a small portion of said force. For example, where the length of the strip is approximately 1.5 inches between its mounting or attaching points, full rated applied pressure will result in an increase of strip length of about 0.004 inches.

Since this movement also takes place at the bellows which caused it, the latter will absorb some of the applied force since it has a finite spring rate. However, in practice, bellows can be obtained having spring rates of approximately 40 lb./inch and 70 lb./inch of axial deflection, with maximum operating pressures of 200 and 450 psi respectively. Even assuming a relatively nonoptimum case whereby a bellows of 0.16 square inch cross-sectional area is chosen, having a spring rate of 70 lbs./inch, it can be calculated that for a 0–100 psi operating range, only 1.75% of the applied force is absorbed by the bellows in extending the required 0.004 inches.

If the example of unwanted long-term component creep of 0.000012 inch cited earlier, which gave an offset of 1% of the conventional prestressed vibrating wire transducer's range, is reapplied to the vibrating strip embodiment above, the following significant facts emerge: (1) a 0.000012 inch change in the free strip length or body length relative to it, will cause the bellows to readjust to accommodate this change absorbing more of the applied force by a factor of 0.00012× spring rate (70 lbs./inch) =0.00084 lbs.; (2) full range force, with 100 psi in a bellows of 0.16 square inches =16 lbs. force, of which 15.72 lbs. was originally applied to the strip; (3) after creep occurred this figure is modified to 15.72−0.00084 lbs. =15.71916 lbs., which represents a change of 0.00534 percent of instrument range. This is 187 times less severe than that which the same magnitude of component creep caused in the prestressed vibrating wire example discussed above.

It will be appreciated, that whereas the conventional prestressed vibrating wire transducer design requires that the stress level in the prestressed wire is at its greatest at zero applied pressure, and decreases to relieve the stress in the wire to perhaps half this level towards full rated pressure because of the reverse direction in which strain is applied to the diaphragm, the apparatus of the invention does the opposite; tensile stress in the vibrating elastic member is minimum at zero applied pressure, and greatest at full rated pressure. Where pressure transducers are applied in a civil engineering environment, it is predominantly the case that high applied pressure is indicative of abnormal and possibly critical structural or foundation behavior.

Although instrument ranges are obviously chosen to accommodate such exceptional eventualities, it is usual for instruments to spend much, if not all of their operational lives being subjected to pressure levels in the lower portion of the operating range: relatively high continuous stress levels exist in the conventional prestressed wire design, while relatively low continuous stress levels exist in the apparatus of the invention. Potential for long-term creep is further exacerbated by extremely high stress and plastic deformation in the swages used to grip the hard music wire normally used in conventional prestressed wire type designs. Experience indicates that long-term creep characteristics tend to increase where continuous stress levels are higher thus rendering the conventional prestressed vibrating wire design much more susceptible to this form of instability than the invention. Even where long-term creep can be quantified in the apparatus of the invention, the invention is vastly less sensitive to similar magnitudes of stress-induced creep.

The apparatus of the invention also displays reduced susceptibility to the detrimental effects of differing temperature coefficients of expansion within the components of the apparatus. The ability of the bellows and relatively unstressed vibrating member combination to readjust to small dynamic dimensional changes as described above, renders the system substantially insensitive to those changes which result due to differential component expansion with temperature change. If one assumes a temperature coefficient mismatch of $2 \times 10^{-6}$ per degree C. between strip and body components which is typical of shim steel versus stainless steel as employed in a preferred embodiment this equates to 0.1 percent of range offset per 75 degrees C. temperature variation. A similar temperature coefficient mismatch would result in 0.1 percent of range offset per 0.4 degrees in the conventional prestressed vibrating wire instrument. Thus, effective temperature compensation may be achieved with less precise temperature coefficient matching in the apparatus disclosed.

The invention also facilitates increased reading resolution for full rated pressure range. As previously explained, in order to minimize the detrimental effects of long-term creep in the conventional prestressed vibrating wire device, it is necessary to limit the prestress induced in the wiring during assembly to approximately 25% of yield stress. Subsequent applied pressure to the diaphragm causes this stress, and thus the wire's resonant frequency, to decrease as applied pressure rises to maximum rated pressure. For practical diaphragm design, physical dimensional constraints limit the linear axial strain response of the unit, such that only a portion of the wire prestress can be relieved as applied pressure approaches rated pressure. Thus the output frequency range is limited by both the relatively low (25% of yield) initial prestress, and the linear diaphragm deflection magnitude.

As a result of the foregoing limitations, the zero to full rated pressure frequency range of the conventional prestressed vibrating wire device is usually restricted to a resolution of about 4000 $f^2/1000$ indicated readout digits. In contrast however the bellows of the invention has no corresponding limitations of linear axial response, and the vibrating member and bellows combination is substantially less affected by component creep, should it occur. Thus, the vibrating elastic member of the invention can be more heavily loaded as full rated pressure is approached.

The above characteristics typically allow a usable reading range in excess of 10,000 $f^2/1000$ indicated digits of resolution, thus providing greater flexibility of application: e.g a 100 psi vibrating strip device according to the invention could be applied to 40 psi applications and would still achieve the same resolutions as would a 40 psi range conventional prestressed vibrating wire transducer.

The invention also possesses practical manufacturing advantages which result in a uniformity of design for a variety of pressure ranges and low completed item wastage rates. In the conventional prestressed vibrating wire device, the basic sensitivity of the instrument is almost entirely dependent on the stiffness of the diaphragm. In practice, suitable response for a particular pressure range is achieved by controlling the diaphragm thickness alone. A variation of a few thousandths of an inch will change the instrument range by hundreds of pounds per square inch. It is therefore quite difficult to produce a series of instruments of identical range which have nearly identical response characteristics. This is in contrast to the scheme presented by the invention. A single bellows type can be used to satisfy a series of pressure range requirements, and bellows can be purchased to close dimensional tolerances. Minor variations in spring rate cause relatively insignificant performance variations as previously explained. Thus the uniformity of performance of units of identical rated range is dependent mainly upon the material cross-sectional shape and area of the vibrating elastic member, which are relatively easily controlled.

Standardized sensitivity performance in instruments of the same range is thus more easily achieved with the invention; but this is only one of the two essential factors required to standardize overall performance of identically ranged instruments. The other is that all instruments should have similar zero pressure equivalent resonances as registered by $f^2/1000$ reading. In this aspect also, the objective is more easily achieved with the invention.

In the conventional prestressed vibrating wire instrument the problem must be met at the time of wire pretensioning and is fixed during assembly. In order to reliably grip a small diameter, commonly 0.009 inch, smooth surfaced musical wire with sufficient force to retain it under tension throughout the working life of the instrument, it is common practice to compress or swage a small bore steel tube over it at each extremity. These end pieces must not only grip the wire reliably but must be securely retained to the diaphragm and body connection points, and it is common assembly practice to satisfy both requirements simultaneously by swaging or deforming both tube end pieces against both the external housing or diaphragm bores and the internal wire. During this operation at the body end, the wire must also be pretensioned, generally by a hanging weight, and secured with a chosen pretension locked in following the swaging operating. As previously mentioned in the conventional prestressed vibrating wire design, approximately 3 thousandths of an inch wire extension occurs from the unstress wire state to the point at which the required pretension (9000 $f^2/1000$) reading is achieved. Thus in order to cause a 100 digit discrepancy from the chosen setting (i.e. 8900 or 9100 $f^2/1000$ reading, equivalent to approximately 2.5% of reading range). There need occur a change in axial position of only approximately 1/30 of one thousandth of an inch during the securing operation.

Since the above described swaging process involves the high pressure deformation of the small bore tube end piece within space confines of the wire passing internally and the body externally, such deformation is invariably accompanied by longitudinal strain tending to reduce the wire prestress applied before the grip was established. The amount of prestress lost is significantly affected by several variables, including minor variations of component dimensions, concentricity, end piece and body hardness, swaging pressure etc. As a result, scatter of many hundred $f^2/1000$ read digits in a batch of one range of otherwise identical transducers is, in practice, unavoidable. Furthermore there is invariably a proportion of each batch in which wire stress is so severely lost during swaging that they have to be discarded as scrap.

In contrast the apparatus of the invention allows, and even derives performance advantages from, securing the vibrating elastic member in an essentially unstressed state with all other active components of the transducer in a neutral or only slightly stressed mechanical state. Furthermore, due to the physical nature of the vibrating elastic member and especially of the thin steel strip of the preferred embodiment, effective securing of this member is very straightforward. The strip can be clamped or spot-welded with negligible disturbance. Nor does the fixing of the strip irretrievably commit the assembler to face failure should any component be proved faulty by subsequent calibration performance evaluation. The strip, bellows saddle, and even the bellows component can be replaced in the preferred design.

In the conventional prestressed vibrating wire design, it is essentially the wire prestress level which dictates the zero applied pressure reading of the instrument, but in the invention, it is primarily the vacuum sealed internally within the transducer housing which dictates it with much greater consistence. It is therefore possible with the invention to achieve much greater overall consistency of performance in transducers of identical range than with the conventional prestressed vibrating wire design In addition range and sensitivity of any unit can be changed merely by substituting the vibrating elastic member with another member with suitable characteristics.

BRIEF DESCRIPTION OF THE DRAWINGS

FIG. 4 is a side view of the saddle assembly shown generally in FIG. 1 at 13.

FIG. 5 is a front view of the assembly shown in FIG. 4.

FIG. 6 is a plan section taken along lines 6—6 in FIG. 5.

FIG. 7 is a partial vertical section of a preferred embodiment showing position of saddle assembly 113 in place with aligning screw 120 exploded and housing 17 (not shown) removed.

FIG. 8 is a section taken at lines 8—8 in FIG. 1.

BEST MODE FOR CARRYING OUT THE INVENTION

Figure 1:
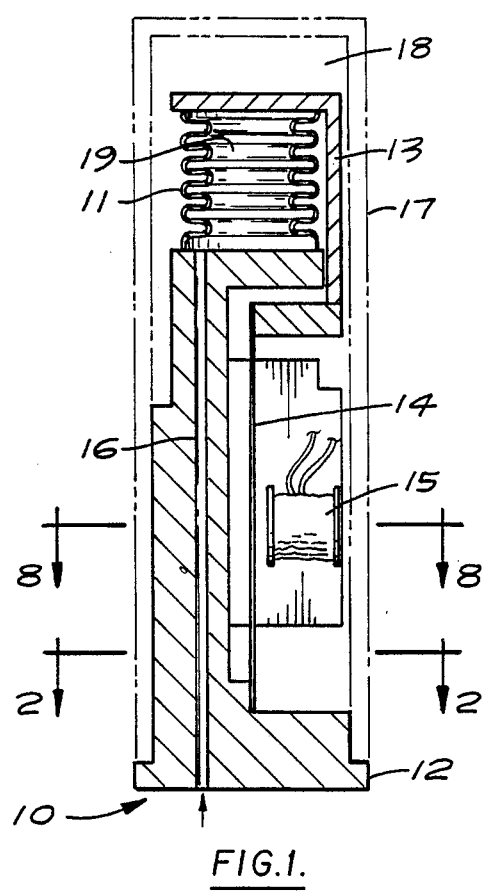
FIG. 1 is a vertical section along lines 1—1 in FIG. 2 illustrating a general scheme of the invention with housing 17 (shown in phantom lines) removed.

Referring now to the drawings wherein like numbers indicate like parts, in FIG. 1 is shown a general scheme of pressure transducer 10. A bellows 11 communicates through pressure port 16 in body 12 with an external pressure shown generally by the arrow at the bottom of FIG. 1. A saddle 13 mechanically connects and translates the vertical expansion and contraction of bellows 11 to the upper end of elastic member 14. Elastic member 14 is affixed to a point at the end of the body opposite bellows 11 by some method such as spot welding. Coil assembly 15 provides the means of electrically exciting and obtaining a frequency output corresponding to the vibration in elastic member 14. A housing 17 encloses reference chamber 18 which surrounds bellows 11, saddle 13, elastic member 14, and coil assembly 15. In the preferred embodiment, housing 17 is sealed by welding to body 12. In a preferred embodiment, reference chamber 18 is evacuated; however, any reference pressure may be used, including a pressure externally applied.

An external pressure applied within bellows 11 through pressure port 16 thereby causes bellows 11 to expand or contract vertically according to whether the external pressure is higher or lower than the reference pressure within housing 17. Bellows 11 is normally constructed of stainless steel to be somewhat resistant to lateral or angular deflection and yet have as small as a spring rate as possible, consistent with a burst pressure rating well in excess of the transducers designed pressure range. The bellows thereby serves as a force converter whereby almost the entire pressure difference between the external pressure and the reference pressure is converted into mechanical force with minimum loss according to the following formula:

Force = Applied Pressure—Reference Pressure ×Effective Bellows Cross-sectional Area The mechanical force thus generated within the bellows is applied via bellows saddle 13 to one end of elastic member 14 which, since it is retained at its other extremity by body 12, is subjected to the full loading thus produced. In the preferred embodiment elastic member 14 is a thin steel strip so proportioned that its cross-sectional area and material strength is adequate to withstand tensile forces greater than those resulting from application of the maximum rated pressure to the confines of bellows 11. The center line of elastic member 14 is mounted on saddle 13 and body 12 along the axial center line of bellows 11. The transducer sensitivity or range may be changed at will by choice of thickness and width of elastic member 14, and/or material within the rated range of bellows 11.

It will be appreciated that the above-referenced overall transducer sensitivity or rated range is therefore dependent ultimately upon the chosen burst pressure rating for the particularly selected bellows 11. The bellows employed in the preferred embodiment are known in the industry as "formed metal bellows", are typically cylindrical in appearance and in a preferred embodiment made of stainless steel. Such formed metal bellows may be made to specification within a wide variety of burst pressure ratings, spring rates, and effective cross-sectional areas. In a preferred embodiment a bellows is employed which has a burst pressure rating in excess of the maximum pressure difference which is expected to be encountered in the transducer's operating environment. Then with that burst pressure rating in mind a bellows is specified which has the smallest possible spring rate consistent with that burst pressure rating. In preferred embodiments, bellows are selected with effective cross-sectional areas suitable for the designed transducer diameter and appropriate to the cross-sectional area and material of the vibrating elastic member. In one embodiment, bellows 11 is rated at 600 psi, has 0.16 square inches effective area, and a spring rate of approximately 200 lbs./inch when ten convolutions are utilized.

Figure 2:
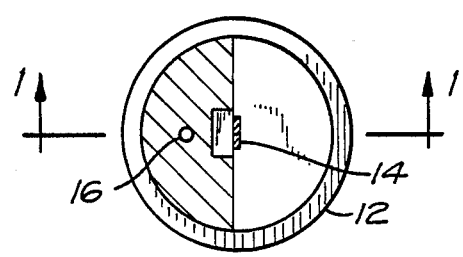
FIG. 2 is a section taken at lines 2—2 in FIG. 1.
Figure 3:
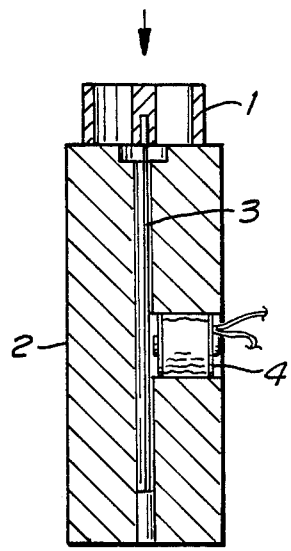
FIG. 3 is an elevational section of a conventional diaphragm type vibrating wire pressure transducer.

Body 12 has (1) the horizontal cross-sectional shape shown generally in FIGS. 2 and 8 in a preferred embodiment but may have any shape and be made of any material so long as one end of the body has a horizontal plane so shaped as to provide a base to which bellows 11 may be welded and within which may be drilled or otherwise formed pressure port 16, (2) a vertical plane for affixing one end of elastic member 14 along the axial center line of bellows 11 and, at the end of the body opposite of bellows 11, a surface adapted for attaching and sealing an open end of housing 17, and (3) mounting means for coil assembly 15. Body 12 is rigid enough so that force translated from bellows 11 by saddle 13 to elastic member 14 does not appreciably alter clearances between it and body 12 or coil assembly 15. Housing 17 may be any shape and may be sealed by various means but in a preferred embodiment it is an open cylindrical canister which is attached and sealed to body 12 by means of welding to a substantially circular lip on body 12 as shown in FIGS. 1 and 2. Body 12 is designed to be dimensionally stable and as insensitive to external influences and stresses as is practically possible.

In FIGS. 4, 5, 6, and 7 are shown details of a preferred embodiment of a saddle assembly 113 which as shown in FIG. 7 substantially replaces saddle 13 shown in FIG. 1. In FIG. 7 it will be noted that bellows 11 is, as in FIG. 1, mounted at its base to body 12. However, top of bellows 11 is sealed by cap 119. In this preferred embodiment bellows 11 is welded to cap 119 and body 12 in a jig to assure alignment of the center line of bellows 11 with the center line of body 12 and the center line of threaded hole 118 in cap 119 with the center line of bellows 11. FIGS. 4 and 5 show side and front views respectively of a preferred embodiment of saddle assembly 113. Saddle assembly 113 is comprised of disk 115, tube 114 and mount 117 Disk 115 has in its center alignment hole 116. Tube 114 has a slot removed in the approximate shape shown by FIGS. 4 and 5. The preferred plan shape for mount 117 is shown in FIG. 6 and provides a vertical planar surface for the upper attaching point of elastic member 14 which in a preferred embodiment is a thin steel strip spot welded to mount 117 on the protruding vertical planar surface. Mount 117 also provides a suitable surface for joining the lower edge of tube 114. The saddle assembly is a 3 piece construction surrounding the bellows by greater than 180 degrees on the coil side of body 12. Disk 115, tube 114, and mount 117 are also welded together as shown in a jig to assure alignment and coplanarity of disk 115 and mount 117, and alignment of the center line of alignment hole 116 and the protruding planar surface of mount 117. The elastic member 14 is also welded to mount 117 in the jig to assure alignment of the center line of elastic member 14 with the center line of alignment hole 116. Saddle 113 is then installed upon bellows 11, with cap 119 assembled, by sliding the slot of saddle assembly 113 over the bellows assembly and inserting screw 120 with suitable sealing compound of any conventional type to hold disk 115 to cap 119 whereby alignment of saddle assembly 113 with bellows 11 is automatic.

Assembly of pressure transducer 10 is then completed after saddle assembly has been installed as above by welding the unattached end of elastic member 14 to body 12 as shown. Coil assembly 15 is then mounted on body 12 for electromechanical excitation of elastic member 14 according to well known methods as shown in FIGS. 1, 8 and 9, and housing 17 is installed, evacuated and sealed.

In compliance with the statute, the invention has been described in language more or less specific as to structural and functional features. It is to be understood, however, that the invention is not limited to the specific features shown, since the means of construction and method herein disclosed comprise only a preferred form of putting the invention into effect. Other modifications and other variations of my apparatus and method will occur to those of ordinary skill in the art. Accordingly, the foregoing description is to be interpreted in an illustrative, and not in a limitative, sense and the invention is claimed in any of its forms or modifications within the legitimate, valid scope of the appended claims appropriately interpreted in accordance with the doctrine of equivalents.

INDUSTRIAL APPLICABILITY

The invention will find use in a variety of engineering application, particularly in the measurement and detection of pressures. The invention will be especially useful where it is important to achieve high long-term accuracy with a high linearity of response and where it may be necessary in particular application to match the range and sensitivity of the pressure transducer with the expected range of pressures to be measured. The method of manufacturing the invention will result in a lower rate of manufacturing rejection and a much improved shelf life. The invention will derive further utility in that it may be easily custom fabricated by attaching an appropriately dimensioned strip with simple welding methods to match the range of pressures expected for the application. In cases where a sensing device will be accessible after installation, a subsequent change in magnitude of pressures or a desired change in sensitivity range of the instrument for any other reason may be accommodated by removing the strip from the device and replacing it with a different strip.

I claim:

1. A pressure transducer comprising:
   (a) a body;
   (b) affixed to one end of said body a closed flexible chamber having an extensible end movable along a single axis of extension in a direction away from said body, the interior of said chamber communicating with an external pressure;
   (c) a saddle connected to said extensible end, said saddle for interconnecting the extensible end of said chamber to one end of an elongated elastic member in such a way that the centerline of said elastic member lies along said single axis of extension of said flexible chamber, said elongated elastic member attached at one end to said saddle at a point lying along said single axis of extension of said chamber and at the other end to said body at a point lying along said single axis of extension of said chamber, whereby extension of said chamber increases stress within said elastic member;
   (d) means positioned to both excite said elastic member into resonant vibration and to generate a frequency related output signal proportional to stress within said elastic member; and
   (e) a housing to enclose said flexible chamber within a reference chamber formed thereby, said reference chamber having a reference pressure, whereby an external pressure applied to the interior of said flexible chamber causes said chamber to extend along its single axis against said reference pressure.

2. The apparatus of claim 1 wherein the axis of said elastic member is congruent with said single axis of extension of said flexible chamber.

3. The apparatus of claim 2 wherein said means to excite said vibration is electromagnetic and said elastic member has magnetic properties.

4. The apparatus of claim 3 where said flexible chamber is a formed metal bellows.

5. The apparatus of claim 4 where said formed metal bellows is made of stainless steel and is substantially cylindrical in shape.

6. The apparatus of claim 4 wherein said saddle partially encloses said bellows.

7. The apparatus of claim 1 wherein said chamber is in communication with an external pressure through a pressure port passing through said body to the interior of said chamber.

8. The apparatus of claim 6 wherein said elongated elastic member is a thin steel strip.

9. The apparatus of claim 6 wherein said elongated elastic member is a steel wire.

10. The apparatus of claim 6 wherein said bellows is closed at the end opposite of said body by a cap in the center of which cap is a threaded hole, said hole having an axis congruent with the axis of said bellows, and wherein said saddle further comprises a disk parallel to said cap, said disk having an alignment hole in its center, the axis of said hole perpendicular to said disk, wherein said alignment hole and said threaded hole are for receiving an alignment screw, whereby fastening said disk of said saddle to said cap of said bellows aligns said saddle with said bellows so that said elongated elastic member is thereby assured of alignment along the axis of said bellows.

11. The apparatus of claim 6 wherein said bellows has a maximum burst pressure rating of 600 pounds and a spring rate of 200 lbs./inch.

12. The apparatus of claim 1 wherein said reference chamber communicates with a pressure which is external to said reference chamber.

13. The apparatus of claim 1 wherein said housing is sealable upon said body to enclose under substantial vacuum said saddle, said flexible chamber, said elastic member, and said means to excite vibration.

* * * * *